United States Patent [19]

Uesugi

[11] Patent Number: 5,283,937
[45] Date of Patent: Feb. 8, 1994

[54] TRUCK LID MOUNTING APPARATUS

[75] Inventor: Kyohei Uesugi, Hiroshima, Japan

[73] Assignee: Mazda Motor Corporation, Hiroshima, Japan

[21] Appl. No.: 973,501

[22] Filed: Nov. 9, 1992

[30] Foreign Application Priority Data

Nov. 15, 1991 [JP] Japan .................................. 3-300676

[51] Int. Cl.⁵ ............................................. B23P 19/00
[52] U.S. Cl. .................................................. 29/281.5
[58] Field of Search ............... 29/429, 431, 771, 783, 29/787, 791, 799, 281.4, 281.1, 281.5; 269/71, 45

[56] References Cited

U.S. PATENT DOCUMENTS 4,086,522  4/1978  Engelberger et al. ............... 29/430
4,358,151  11/1982  Wood ................................. 29/401.1
5,079,822  1/1992  Arai et al. ............................. 29/787
5,090,105  2/1992  DeRees ................................ 29/460

FOREIGN PATENT DOCUMENTS 62-99272  8/1987  Japan .

Primary Examiner—Robert C. Watson
Attorney, Agent, or Firm—Keck, Mahin & Cate

[57] ABSTRACT

A trunk lid mounting apparatus for use with an automobile includes a jig for positioning a trunk lid to which hinges are attached and mounting the trunk lid downward on a body. The jig includes a device for positioning the hinges, which device is adapted to be capable of passing through an opening in which an audio speaker is to be fit. The opening is usually provided on a package tray located at the rear of the body.

4 Claims, 4 Drawing Sheets

TRUCK LID MOUNTING APPARATUS

BACKGROUND OF THE INVENTION

This invention relates to an apparatus for mounting a trunk lid on an automobile body using a robot in an automobile assembly line.

RELATED ART STATEMENT

Robots are generally used to mount various parts including doors, a hood and a trunk lid on a body of an automobile in a final stage of an automobile assembly line. High precision is required in mounting the parts. To this end, Japanese Patent Public Disclosure (Kokai) No. 62-99272 uses specific jigs, which are manufactured to fit to the various parts, to suitably place and hold them and then mount them on an automobile body.

Trunk lids transported to an automobile assembly station usually have a pair of hinges secured to a front end of a trunk lid. The trunk lid will swing about the hinges after being assembled to an automobile body. The hinges are to be screwed to a portion of the body which will be located adjacent to a package tray disposed at the rear of a passenger's compartment when the trunk lid is mounted on the body.

When a trunk lid is mounted on a body, the trunk lid is usually positioned and held suitably using jigs above the body and then lowered to mount on the body. However, since a package tray is located at the back of a passenger's compartment and above a portion of the body to which the hinges are to be secured, the presence of the package tray makes it difficult to set the hinges in a suitable position inside the body when the trunk lid is mounted on the automobile body. In other words, since the hinges are pivotably located below the package tray when the trunk lid is suitably positioned, operations to be done from an upper side of the hinges are quite difficult or nearly impossible with the result a properly position of the hinges.

Thus, the aforementioned difficulty in operations deteriorates efficiency of mounting trunk lids and needs to be solved.

SUMMARY OF THE INVENTION

It is an object of the present invention to provide an apparatus for automatically positioning hinges when a trunk lid is mounted on a body.

The invention provides a trunk lid mounting apparatus for use with an automobile comprising a jig for positioning a trunk lid to which hinges are attached and mounting the trunk lid downward on a body. The jig includes a unit for positioning the hinges. The unit is adapted to be capable of passing through an opening in which an audio speaker is to be fit, which opening is provided on a package tray located at the rear of the body.

In a preferred embodiment of the invention, the unit is selectively positioned between a horizontal position for positioning the hinges in a predetermined position for assembling and a vertical position wherein the unit is capable of passing through the opening.

In another preferred embodiment of the invention, the unit includes a lever pivotably mounted on the jig for positioning the unit in either of its two positions and an actuator for holding the lever in a predetermined position.

The advantages obtained by the invention will be described hereinbelow.

When a trunk lid is mounted on a body using the jig, the hinges attached to the trunk lid in advance are passed through the openings located on the package tray and in which audio speakers are to be fit and automatically positioned by hinge positioning means provided on the jig.

Further, when the trunk lid is positioned in a suitable position by using the jig, the actuator sets the lever for positioning the hinges in vertical position to ensure that the lever can pass through the opening, and after the trunk lid is set in its position, the actuator sets the lever in horizontal position to properly position the hinges. Thus, the hinges are automatically positioned after the trunk lid is positioned in its position and therefore positioning hinges can be accomplished more easily than before with the result of high operation efficiency.

The above and other objects and advantageous features of the present invention will be made apparent from the following description made with reference to the accompanying drawings.

DESCRIPTION OF THE PREFERRED EMBODIMENT

A preferred embodiment in accordance with the invention will be explained hereinbelow with reference to drawings.

Figure 4:
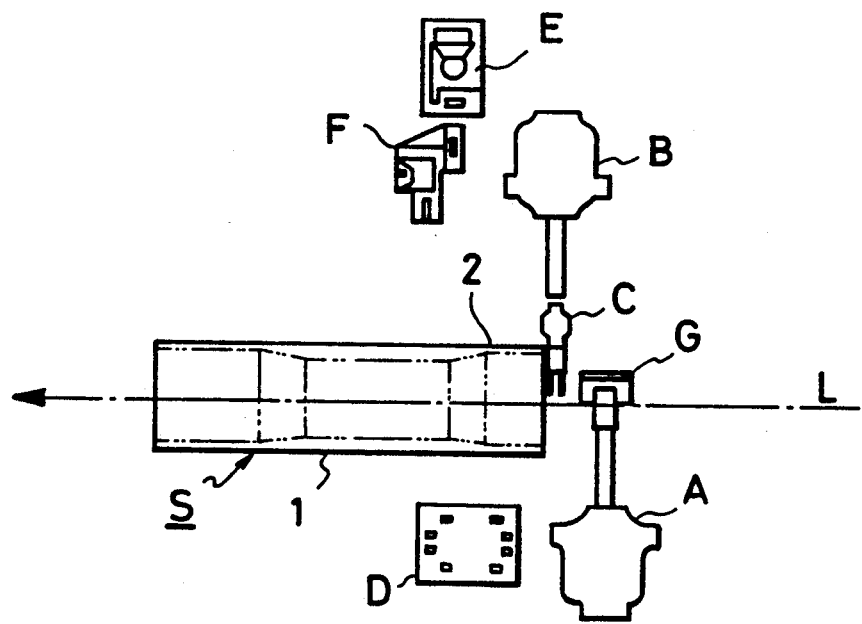
FIG. 4 is a schematic view of a trunk lid mounting station which is one part of an automobile assembly line.

As illustrated in FIG. 4, a trunk lid mounting apparatus is used in a trunk lid mounting station S which is a final stage of automobile assembly line L. The apparatus uses a robot A to mount a trunk lid 2 on an automobile body 1 transported into the station S. As shown in FIG. 4, the trunk lid mounting station S includes a robot B for fastening screws, a nut-runner C, a jig D for positioning the trunk lid 2 prior to assembling, a part-feeder E, a source F of nuts, and a jig G for positioning and holding the trunk lid 2 when assembling.

Figure 1:
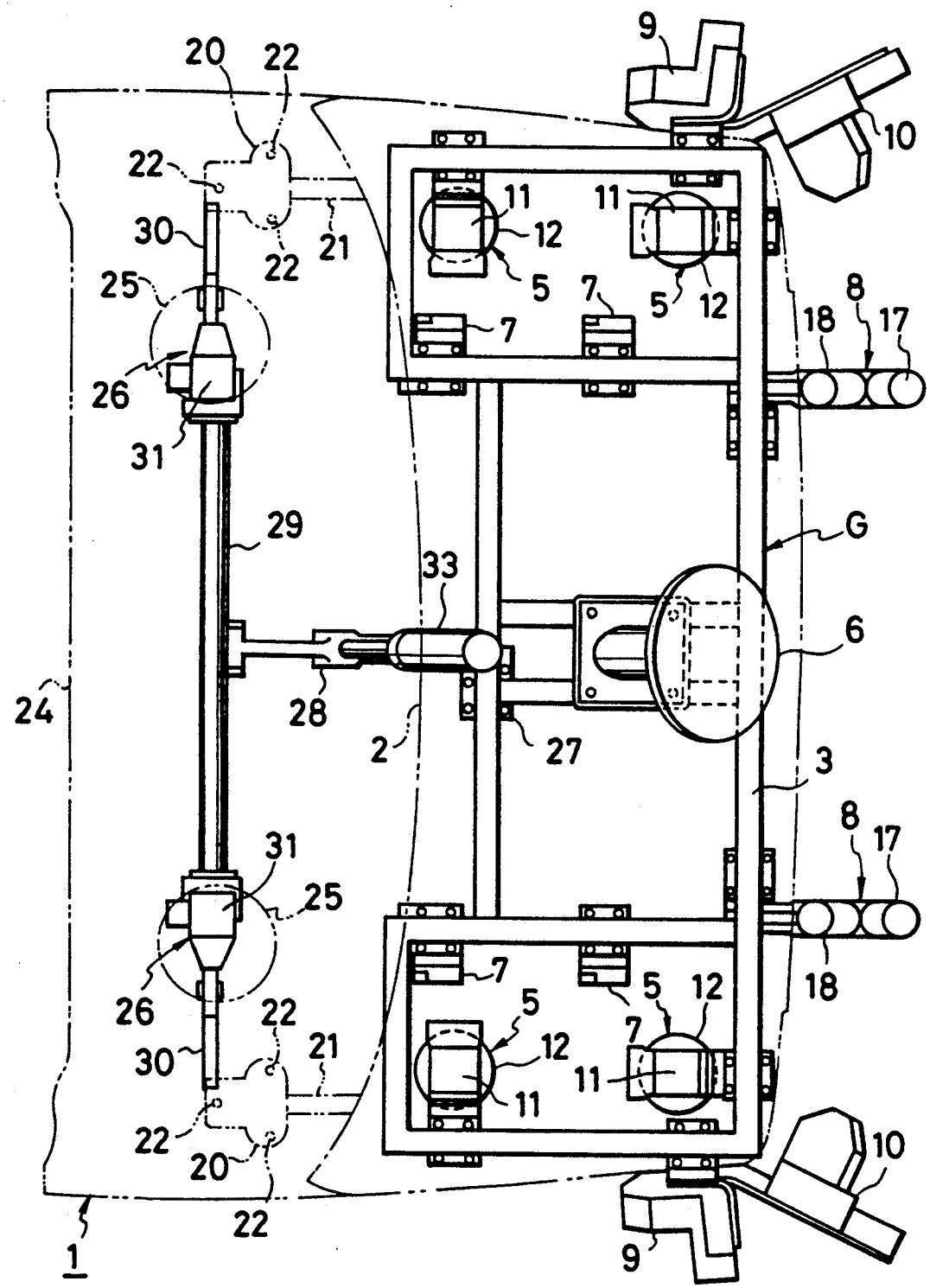
FIG. 1 is a top plan view illustrating the trunk lid mounting apparatus in accordance with the invention.
Figure 2:
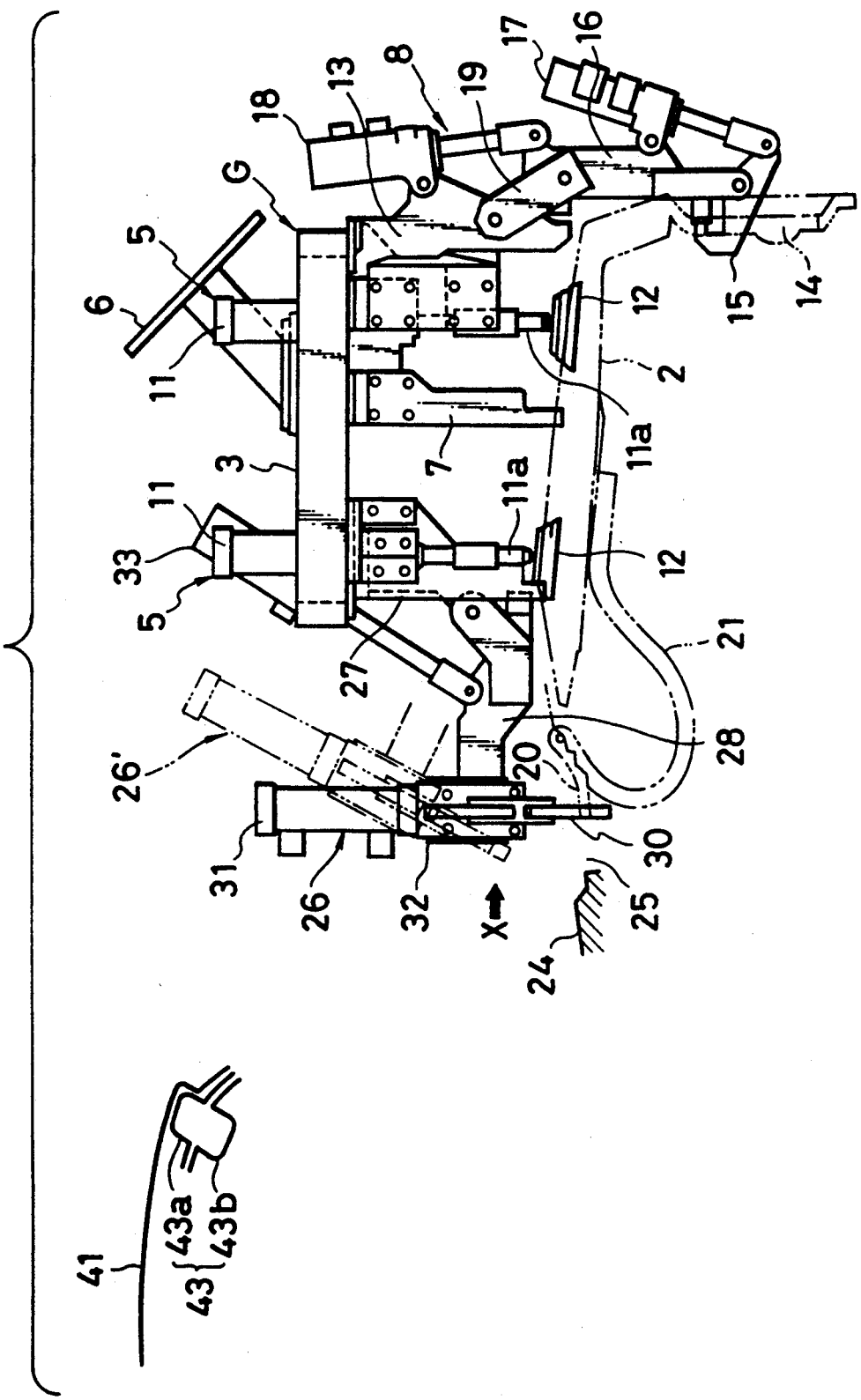
FIG. 2 is a side view illustrating the trunk lid mounting apparatus in accordance with the invention.

As illustrated in FIGS. 1 and 2, the jig G includes a generally rectangular frame 3 and four vacuum units 5 for absorbing the trunk lid 2 each of which extends downward at the four corners of the frame 3. The jig G further includes a tool changer 6 to which a head of the robot A is to be secured, positioning members 7, clamp units 8 for clamping a rear end of the trunk lid 2, first sensors 9 for detecting a space between the trunk lid 2 and the body 1, and second sensors 10 for detecting a step between the trunk lid 2 and the body 1.

As illustrated in FIG. 2, the vacuum unit 5 each includes a cylinder 11 secured to the frame 3 so that the cylinder 11 extends downward, and a vacuum pad 12 provided at a lower end of a rod 11a of the cylinder 11. When the cylinders 11 extend downward, the vacuum pads 12 can absorb a top surface of the trunk lid 2 thereby to position and hold the trunk lid 2.

Each clamp unit 8 is secured to a support member 13 which is secured to the frame 3 and extends downward from the frame 3 at the rear end thereof. The clamp unit 8 each includes a clamp claw 15 which is to be inserted through an opening 14 formed in the rear of the trunk lid 2 and then clamps the trunk lid 2, a pivot arm 16 which pivotably supports the clamp claw 15 at its center and is pivotably carried by the support member 13, a first clamp cylinder 17 for pivoting the clamp claw 15, which cylinder 17 is connected to the clamp claw 15 at the other end than that for clamping the trunk lid 2 and pivotably carried by the pivot arm 16, and a second cylinder 18 for pivoting the pivot arm 16, which cylinder 18 is connected to the pivot arm 16 at its upper end and pivotably carried by the support member 13. The pivot arm 16 is carried by the support arm 13 through a bracket 19.

The trunk lid 2 is transported to the assembly station S with a pair of hinges 20 being attached to the trunk lid 2 through a pair of hinge arms 21. The hinges 20 each have three holes 22 through which bolts are screwed to a portion 23 (see FIG. 3) of the body 1 on which the hinges 20 are to be secured. A reference number 24 represents a package tray provided at the rear of the body 1 and a reference number 25 represents an opening formed on the package tray 24. An audio speaker is to be fit into this opening 25.

Figure 5:
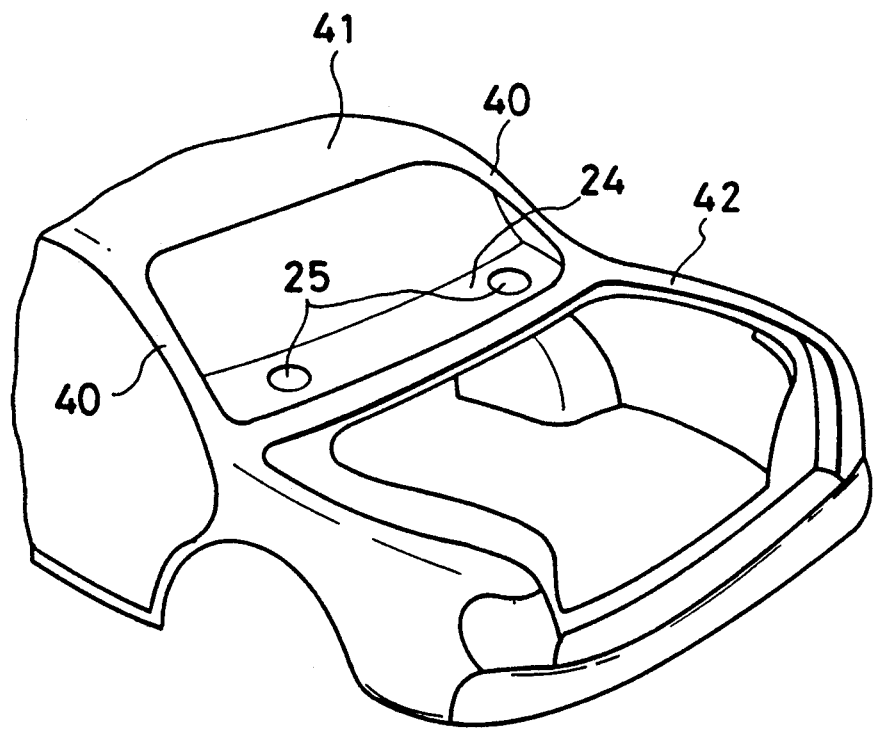
FIG. 5 is a perspective view illustrating an autombile's rear where a trunk lid is to be mounted thereon.

As illustrated in FIG. 5, the package tray 24 is disposed inside the passenger's compartment and just below a rear wind-shield, and extends transversely between rear pillars 40 which connects a roof 41 to a trunk portion 42. The openings 25 are provided on the package tray 24 symmetrically with respect to the longitudinal center line of the automobile. Just below the roof 41 transversely extends a rear header 43 comprising a rear header upper 43a and a rear header lower 43b, a cross-section of the rear header 43 being shown in FIG. 2.

The jig G includes a pair of hinge positioning units 26 which can pass down through the openings 25 and positions the hinges 20 for being mounted on the body 1.

A support arm 28 extending forward is pivotably carried by a stay 27 carried by the frame 3 at the center of the front end thereof and extending downward. The support arm 28 carries at the front end a transverse arm 29 extending transversely of the body 1 and having the hinge positioning units 26 at opposite ends. The support arm 28 is pivotably actuated by a cylinder 33.

Figure 3:
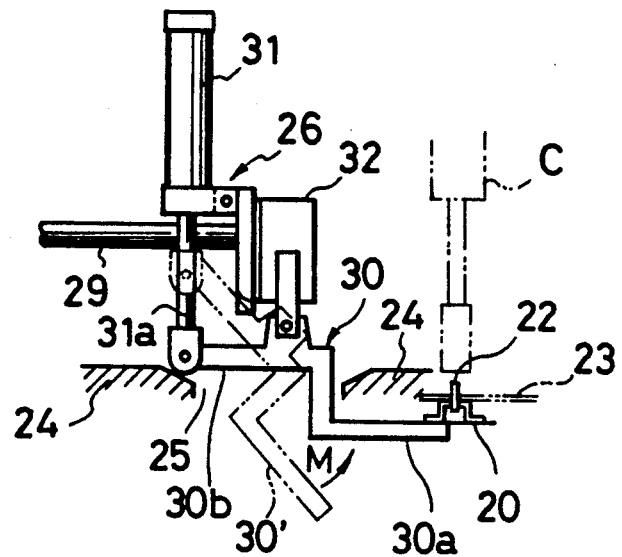
FIG. 3 is a front view of a right half of the apparatus seen from a direction indicated by an arrow X in FIG. 2.

As illustrated in FIG. 3, the units 26 each include a positioning lever 30 pivotably carried by the arm 29 so that the lever 30 can selectively take two positions; a horizontal position, represented by a solid line in FIG. 3, for positioning the hinges 20 in assembling position and a vertical position, represented by a broken line in FIG. 3, in which the lever 30' can pass through down the opening 25. The units 26 each further includes a cylinder 31 as an actuator for keeping the lever 30 in predetermined positions.

The lever 30 comprises a first portion 30a for engaging a lower surface of the hinges 20 when the lever 30 is in its horizontal position, and a second portion 30b integrally formed with the first portion 30a at its proximal end. The second portion 30b has a shape of reversed "L" and thus the lever 30 is generally shaped in a capital letter "Z". The second portion 30b is pivotably supported at its center by a bracket 32 secured to the arm 29 at its end.

The cylinder 31 is pivotably carried by the bracket 32 so that the cylinder 31 extends downward and has a rod 31a at the lower end of which the second portion 30b of the lever 30 is pivotably carried by the rod 31a.

The operation for mounting the trunk lid 2 on the body 1 using the jig G will be explained hereinbelow.

The trunk lid 2 is first positioned for mounting on the body 1 by the jig D in FIG. 4. Then, the trunk lid 2 is further positioned by the vacuum units 5 of the jig G mounted on the head of the robot A, and the clamp units 8.

Then, the jig G, which is positioning and holding the trunk lid 2, is transported above the body 1, in particular, an open space on which the trunk lid 2 is to be mounted by detecting a space and a step between the trunk lid 2 and the body 1 using the first and second sensors 9 and 10, the trunk lid 2 is properly positioned on the open space. During this positioning, the cylinder 33 retracts so that the hinge positioning units 26 are in inclined positions 26, as illustrated in dotted lines in FIG. 2, and the cylinders 31 also retract so that the levers 30 are in downwardly inclined positions 30' as illustrated in dotted lines in FIG. 3. Thus, interference between the units 26 and the package tray 24 can be avoided when positioning the trunk lid 2 on the body 1.

After completion of positioning the trunk lid 2, when the cylinder 33 is controlled to extend so that the hinge positioning units 26 are in vertical positions, the lever 30 can pass through the openings 25 as shown in FIG. 3.

Then, when the cylinder 31 is controlled to extend again, the lever 30 pivots in the direction indicated by an arrow M in FIG. 3 to engage a lower surface of the hinges 20. Thus, the hinges 20 are properly positioned at the portions 23 of the body 1 at which the hinges 20 are to be mounted. With this condition being kept, the nut-runner C screws bolts to the body 1 through the holes 22 of the hinges 20 thereby mentioning the trunk lid 2 on the body 1.

As aforementioned with reference to the preferred embodiments, the present invention has advantages. When the jig G positions the trunk lid 2 in a predetermined position, the levers 30 are positioned vertically so that they can pass through the opening 25, whereas after the trunk lid 2 is positioned, the levers 30 are positioned horizontally in order to position the hinges 20 in a predetermined position, as aforementioned. Thus, the hinges 20 are automatically positioned after the trunk lid 2 is positioned with the result that the operation of positioning the hinges 20 can be accomplished more easily than before.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A trunk lid mounting apparatus for use in assembling an automobile comprising:
    first means for holding the trunk lid in position relative to a car body, said trunk lid having hinges attached thereto for rotatably securing the trunk lid to the car body; and
    second means for positioning the hinges onto the car body, located closer to a front of the automobile than a front end of the trunk lid held by said first means, said second means being selectively positioned between an angular position wherein said second means can pass downward through openings provided on a package tray located behind rear seats and into which audio speakers are to be fit, and a horizontal position for positioning the hinges in a predetermined position for assembly operation.

2. A trunk lid mounting apparatus in accordance with claim 1 wherein said second means includes a lever pivotable between said angular position and said horizontal position and an actuator for positioning and holding the second means in either of said angular position and said horizontal position.

3. A trunk lid mounting apparatus in accordance with claim 1 wherein said second means is vertically movable relative to said first means so that said second means can selectively take an upper position, in which said second means stands by prior to passing through the speaker openings, and a lower position, in which said second means has passed through the speaker openings.

4. A trunk lid mounting apparatus in accordance with claim 3 and further comprising a support arm carried by said first means for supporting said second means, said support arm being actuated to and held in position by an actuator so that said second means takes either of said angular position and said horizontal position.

* * * * *